United States Patent [19]
Haddad, Jr.

[11] Patent Number: 5,165,461
[45] Date of Patent: Nov. 24, 1992

[54] RECEPTACLE COVER

[75] Inventor: Edward N. Haddad, Jr., Worcester, Mass.

[73] Assignee: Pioneer Consolidated Corporation, Oxford, Mass.

[21] Appl. No.: 625,826

[22] Filed: Dec. 11, 1990

[51] Int. Cl.⁵ .............................................. B60P 7/02
[52] U.S. Cl. .................................. 160/265; 160/310; 160/315; 296/100
[58] Field of Search ............... 160/310, 311, 312, 315, 160/265; 296/100; 4/502

[56] References Cited

U.S. PATENT DOCUMENTS

| | | | |
|---|---|---|---|
| 783,587 | 2/1905 | Nicewaner | 160/265 |
| 1,468,832 | 9/1923 | Parsons | 160/312 X |
| 1,750,285 | 3/1930 | Schuler | |
| 1,751,735 | 3/1930 | Hicinbothem | |
| 1,827,059 | 10/1931 | Woolcott | |
| 2,594,597 | 4/1952 | Taylor | 296/100 |
| 2,668,586 | 2/1954 | Luckie | 160/241 |
| 3,041,104 | 6/1962 | Richard | 296/100 |
| 3,416,834 | 12/1968 | Morse, Jr. | 296/100 |
| 3,841,697 | 10/1974 | McFarland | 296/100 |
| 3,910,629 | 10/1975 | Woodard | 296/137 |
| 3,942,830 | 3/1976 | Woodard | 296/105 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,027,911 | 6/1977 | Johnson | 296/23 |
| 4,030,780 | 6/1977 | Petretti | 296/100 |
| 4,032,186 | 6/1977 | Pickering et al. | 296/100 |
| 4,046,416 | 9/1977 | Penner | 296/98 |
| 4,050,734 | 9/1977 | Richard | 296/98 |
| 4,095,840 | 6/1978 | Woodard | 296/100 |
| 4,116,152 | 9/1978 | Larsson | 114/106 |
| 4,157,202 | 6/1979 | Bachand | 296/100 |
| 4,189,178 | 2/1980 | Cramaro | 296/105 |
| 4,203,174 | 5/1980 | Shultz | 4/172 |
| 4,216,990 | 8/1980 | Musgrove et al. | 296/213 |
| 4,295,262 | 10/1981 | Grote et al. | 29/462 |
| 4,341,416 | 7/1982 | Richard | 296/98 |
| 4,469,317 | 9/1984 | Grote et al. | 269/69 |
| 4,494,707 | 1/1985 | Niibori | 242/67.2 |
| 4,516,802 | 5/1985 | Compton | 296/98 |
| 4,518,194 | 5/1985 | Kirkham et al. | 296/100 |
| 4,740,029 | 4/1988 | Tuerk | 296/100 |
| 4,874,196 | 10/1989 | Goldstein et al. | 296/98 |

FOREIGN PATENT DOCUMENTS

1060927 8/1979 Canada.

Primary Examiner—Carl D. Friedman
Assistant Examiner—Derek J. Berger
Attorney, Agent, or Firm—Weingarten, Schurgin, Gagnebin & Hayes

[57] ABSTRACT

A covering apparatus for a receptacle having an open top including, a cover having a first end and a second end and a length and width sufficient to cover the open top of the receptacle, a spring loaded roller, rotatably mounted at one end of the receptacle and to which the first end of the cover is attached, the roller being adapted for retracting and winding the cover about said roller, a pair of first cable pulleys, one of each of the first cable pulleys rotatably mounted at one end of the receptacle, a pair of second cable pulleys, one of each of the second cable pulleys rotatably mounted at the other end of the receptacle, a cable loop engaging the first cable pulley and the second cable pulley, the second end of said cover attached to the cable loop, and an energizing device for causing the pair of first cable pulleys to rotate so as to cause the cable loop to move about the first and said second cable pulleys. The apparatus has a first covered configuration in which the cover is unwound from the roller and extends over the top of the receptacle, and a second uncovered configuration in which the cover is wound about the spring loaded roller and the top of the receptacle is uncovered.

11 Claims, 11 Drawing Sheets

RECEPTACLE COVER

The invention relates to an apparatus for covering open top receptacles.

BACKGROUND OF THE INVENTION

Open top receptacles such as open bed trailers, railroad cars and containers, whether moving or stationary, frequently must be covered, especially when loaded with loose material such as sand. The cover prevents the material from being blown from the receptacle by either the wind or by the airstream created when the receptacle is moved. Further, many materials, such as dirt or grain, must additionally be protected from the elements and a cover provides such protection.

Large open top receptacles are constructed without a cover for easy top loading. The requirements of a cover are fulfilled by providing a removable cover, such as of canvas, which is secured over the top of the open top receptacle once the material to be contained has been loaded. Although a loose separate fabric sheet may be used as a cover, the problems with handling such a large piece of material and the storage of the cover when it is not positioned over the receptacle top makes such a solution less than optimal. The invention herein disclosed relates to a covering apparatus in which the cover retracts into a housing located at the front of the receptacle when not in use.

SUMMARY OF THE INVENTION

One aspect of the covering apparatus for a receptacle having an open top is that the apparatus includes, a cover having a first end and a second end and a length and width sufficient to cover the open top of the receptacle, a spring loaded roller, rotatably mounted at one end of the receptacle and to which the first end of the cover is attached, the roller being adapted for retracting and winding the cover about said roller. A pair of first cable pulleys, one of each of the first cable pulleys rotatably mounted at one end of the receptacle and a pair of second cable pulleys, one of each of the second cable pulleys rotatably mounted at the other end of the receptacle, engages a cable loop. The second end of the cover is attached to the cable loop. An energizing device causes the pair of first cable pulleys to rotate so as to cause the cable loop to move about the first and said second cable pulleys. The apparatus has a first covered configuration in which the cover is unwound from the roller and extends over the top of the receptacle, and a second uncovered configuration in which the cover is wound about the spring loaded roller and the top of the receptacle is uncovered.

Another aspect of the covering apparatus for a receptacle having an open top is that it includes a flexible cover having a first end and a second end and a length and width sufficient to cover the open top of the receptacle and a spring loaded roller, rotatably mounted at the front end of the receptacle and to which said first end of the cover is attached. The roller is adapted for retracting and winding the cover about the roller. A pair of first cable pulleys, one of each of the first cable pulleys rotatably mounted at one end of the receptacle and a pair of second cable pulleys, one of each of the second cable pulleys rotatably mounted at the other end of the receptacle engages a cable loop. A bow member is fixedly attached to the cable loop and to the bow member the second end of the cover is attached. A motor is positioned for causing the pair of first cable pulleys to rotate so as to cause the cable loop to move about the first and the second cable pulleys, and thereby to cause the bow member to move. The apparatus has a first covered configuration in which the cover extends over the top of the receptacle, and a second uncovered configuration in which the cover is wound about the spring loaded roller and the top of the receptacle is uncovered.

Yet another aspect of the invention is a covering apparatus for a receptacle having an open top, said receptacle having a first end and a second end, the covering apparatus including a cable, a cover having a first end and a second end and a length and width sufficient to cover the open top of the receptacle, the first end of the cover attached to the first end of the receptacle, the second end of the cover attached to the cable, and a cable pulley mounted on the second end of the receptacle, the cable adapted for movement over the cable pulley. The apparatus has a first uncovered configuration in which the top of the receptacle is uncovered and a second covered configuration in which the cover extends over the top of the receptacle and beyond the second end of the receptacle.

DESCRIPTION OF THE DRAWINGS

These and other features of the invention are more fully set forth in the detailed description and drawing of which:

FIG. 3b is an expanded view of the region A of FIG. 3a;

FIG. 7b is a perspective view of the cable clamp portion of FIG. 7a.

DESCRIPTION OF THE PREFERRED EMBODIMENT

Figure 1:
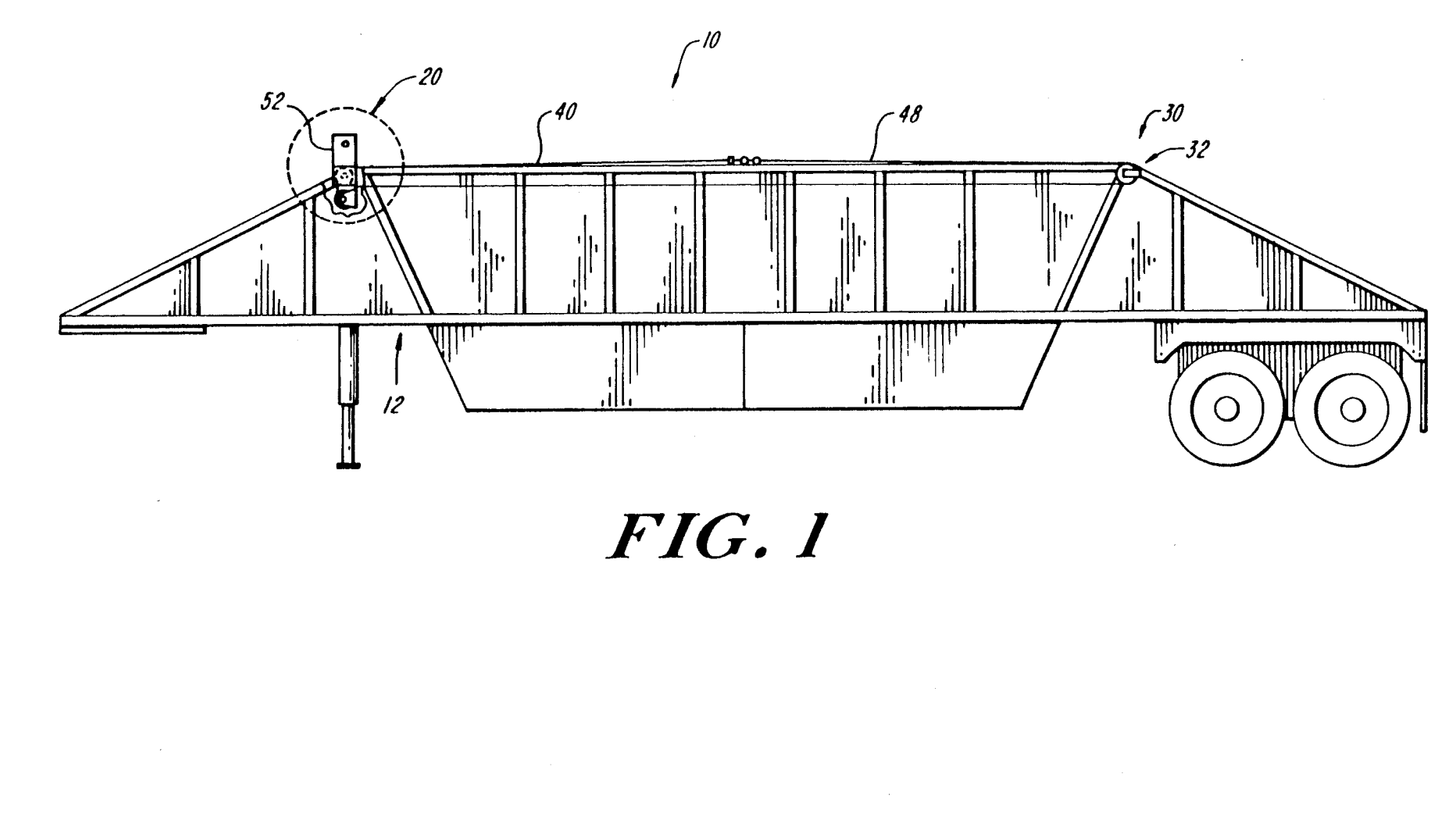
FIG. 1 is a side view of an embodiment of the invention on an open top receptacle.

In brief overview, referring to FIG. 1, an embodiment of the receptacle cover apparatus 10 located on an open top receptacle 12, which for the purpose of example only is shown as an open bed trailer, includes a front portion 20, a rear portion 30, a cover 40 and a pair of cables 48, one of each being located along a respective side of the receptacle 12. In the closed configuration, the cover 40 is pulled from its storage area in the front portion 20, over the top of the receptacle 12 up to the rear portion 30 by means of the cables 48. To uncover the top of the receptacle 12 and store the cover 40, tension on the cables 48 is released and the cover 40 is pulled into its storage area in the front portion 20 of the apparatus 10.

Figure 2:
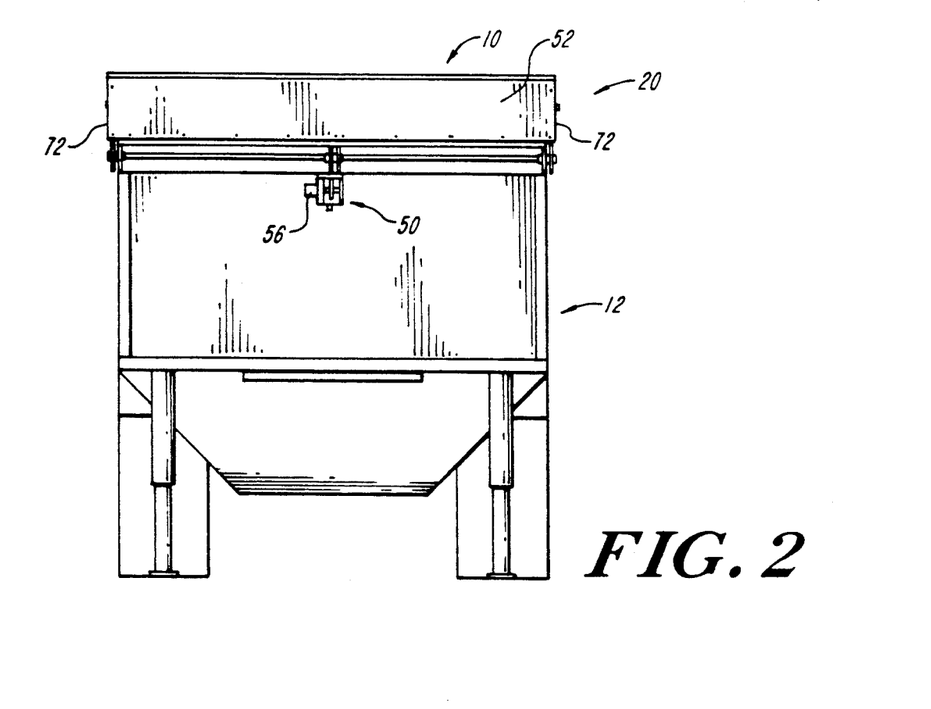
FIG. 2 is a front view of the embodiment of FIG. 1 located on the open top receptacle.
Figure 3:
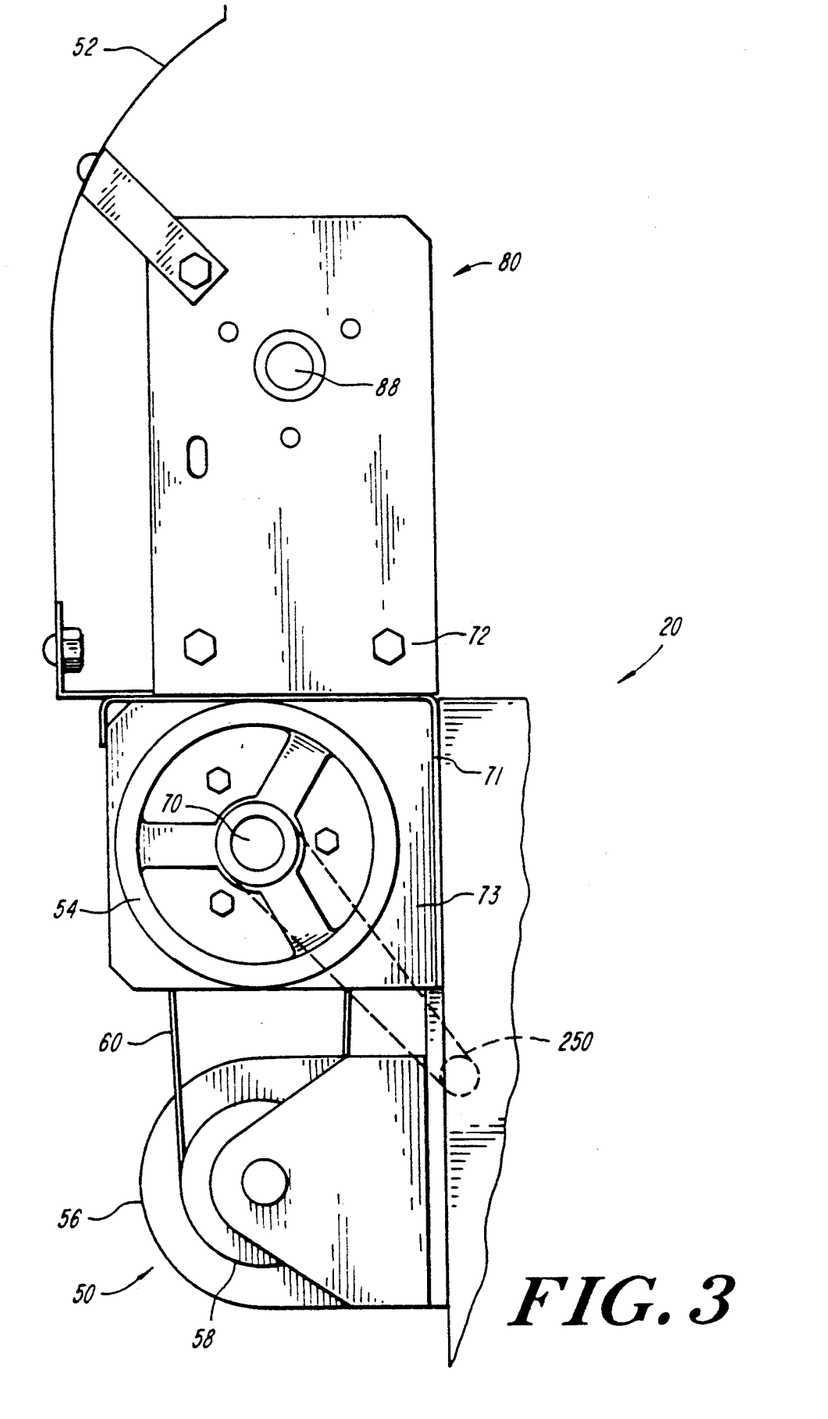
FIG. 3 is a side view of the forward portion of the embodiment of the invention shown in FIG. 1.

Considering each portion in more detail, referring to FIGS. 2 and 3, the front portion 20 is located along the top front edge of the receptacle 12, and attached to the receptacle 12 by means of a mounting bracket 71. The mounting bracket 71 is attached to the front of the receptacle 12. Attached to the mounting bracket 71 are two pairs of upper and lower side plates 72,73 respectively, located adjacent each side of the receptacle 12, and a windscreen 52, positioned such that the windscreen 52 extends above the top front edge of the receptacle 12.

Figure 3A:
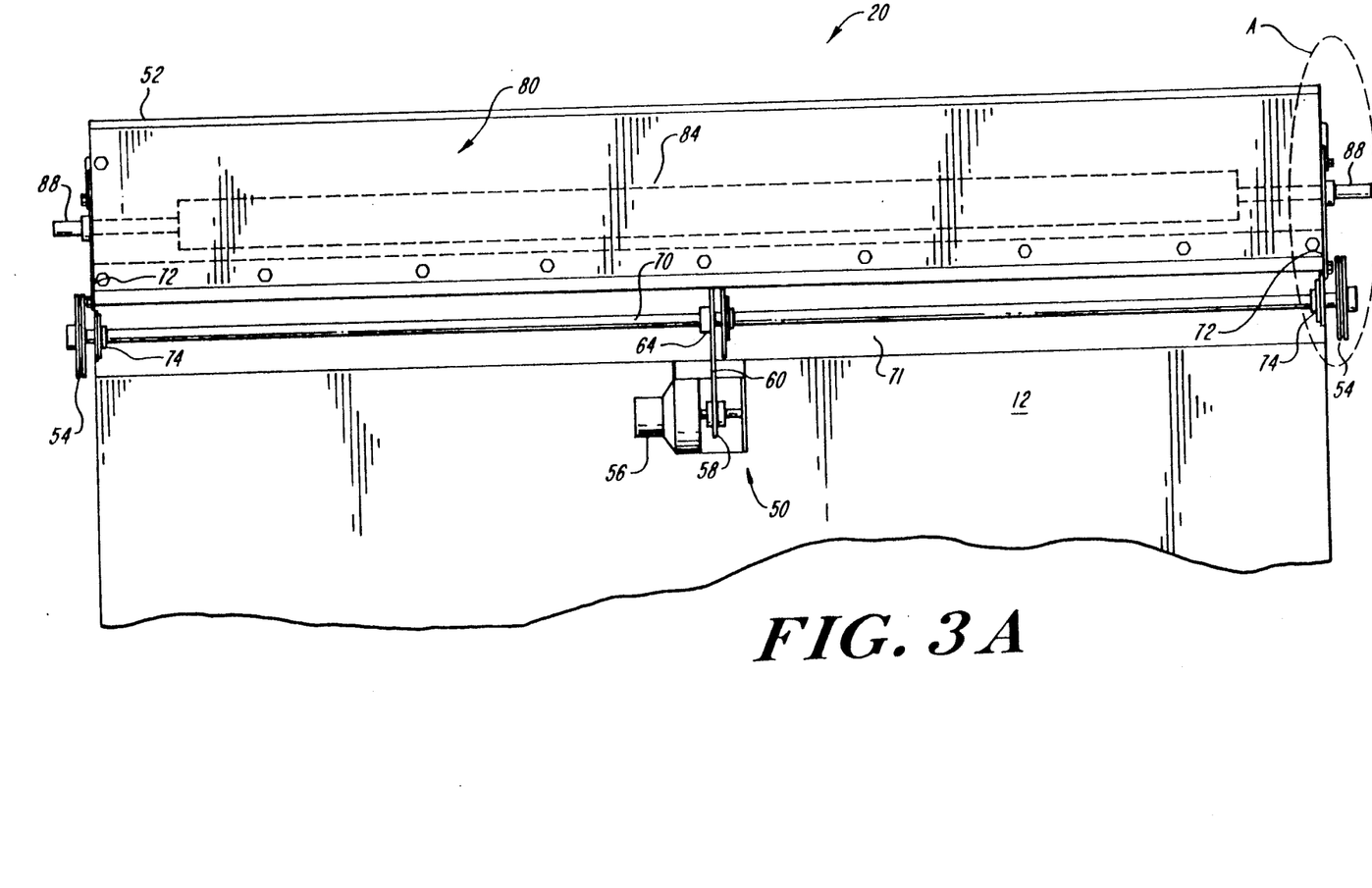
FIG. 3a is a front view of the forward portion of the embodiment of the invention shown in FIG. 3.

Referring also to FIG. 3a, the front portion 20 includes an upper portion 80, located between the upper side plates 72, and a drive motor assembly 50 located between the lower side plates 73 adjacent the front surface of the receptacle 12 and below the windscreen 52. The drive motor assembly 50 includes a motor 56 which, when energized, rotates a slip clutch 58 to drive a chain 60. The chain 60, in turn, causes a drive sprocket 64 located midway between the side plates 72 to rotate. The drive sprocket 64 is fixedly attached to a drive shaft 70 which extends through each of the lower side plates 73 and is permitted to rotate by means of bearings 74 mounted to the inner wall of each lower side plate 73. The bearings 74 permit the drive shaft 70 to rotate when the drive sprocket 64 is driven by the chain 60. Fixedly attached to each end of the drive shaft 70 which project beyond the lower side plates 72 are drive pulleys 54. Cables 48 ride upon the drive pulleys 54 and therefore the motor 56 causes the cables 48 to move when the motor 56 causes the drive sprocket 64 to rotate.

Figure 3B:
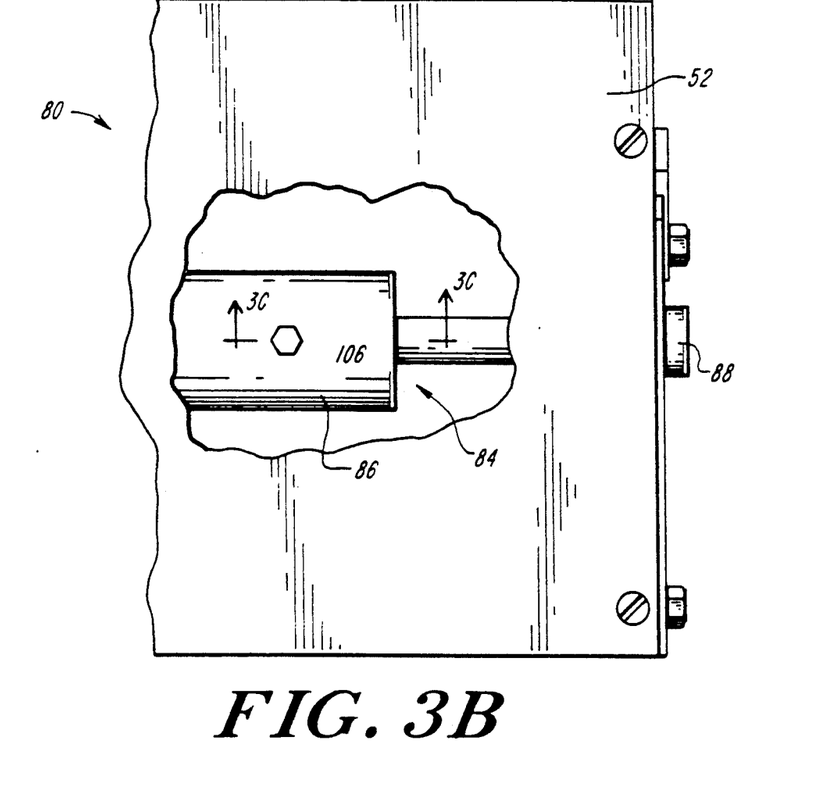
Figure 3C:
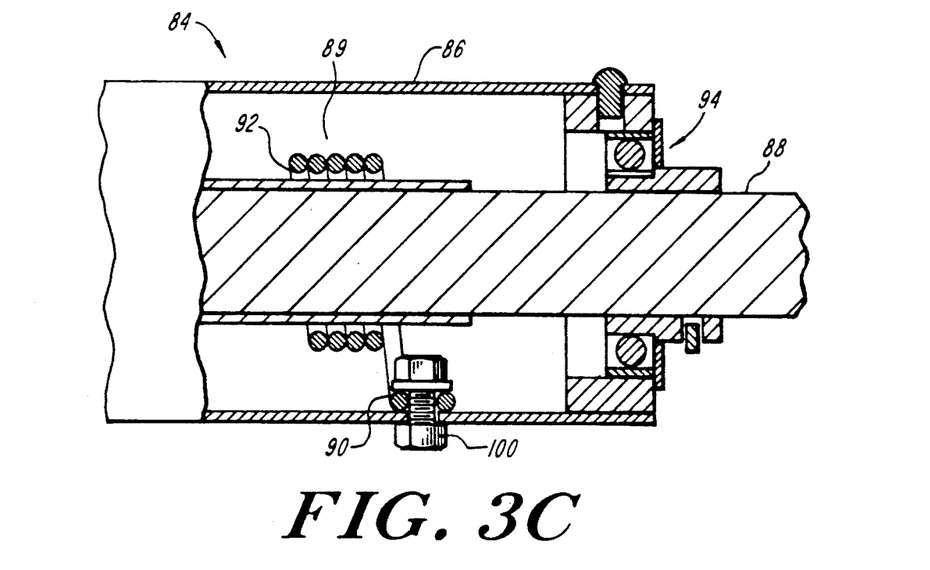
FIG. 3c is a sectional view of section A—A' in FIG. 3b.

Referring also to FIGS. 3b and 3c, the upper portion 80 of the front portion 20 is the storage area for the cover 40. The upper portion 80 includes a spring loaded roller assembly 84. The spring loaded roller assembly 84 includes a roller 86 coaxially and rotatably mounted on an axle 88 by way of a pair of bearing assemblies 94 attached to each end of the roller 86. Each end of the axle 88 is fixedly attached to one of the upper side plates 72 attached at each side of the receptacle 12. In this way, the roller 86 is free to rotate about the axle 88, but the axle 88 does not rotate. Coaxially mounted about axle 88 is a coil spring 89. One end 92 of the coil spring 89 is fixedly attached to axle 88. The other end 90 of the coil spring 89 is fixedly attached to the roller 86 by means of a bolt 100.

The spring loaded roller assembly 84, to which is attached one end of the cover 40, is constructed in the same manner as a retractable window shade. As the roller 86 of the spring loaded roller assembly 84 rotates to permit the cover 40 to be extended, the coil spring 89 is torsioned about axle 88 and serves to bias the roller 86 to rotate in the opposite direction, that is, to retract the cover 40. In this way, the cover 40 is rolled about the roller 86 during storage and is unrolled from the roller 86 for use.

Figure 4:
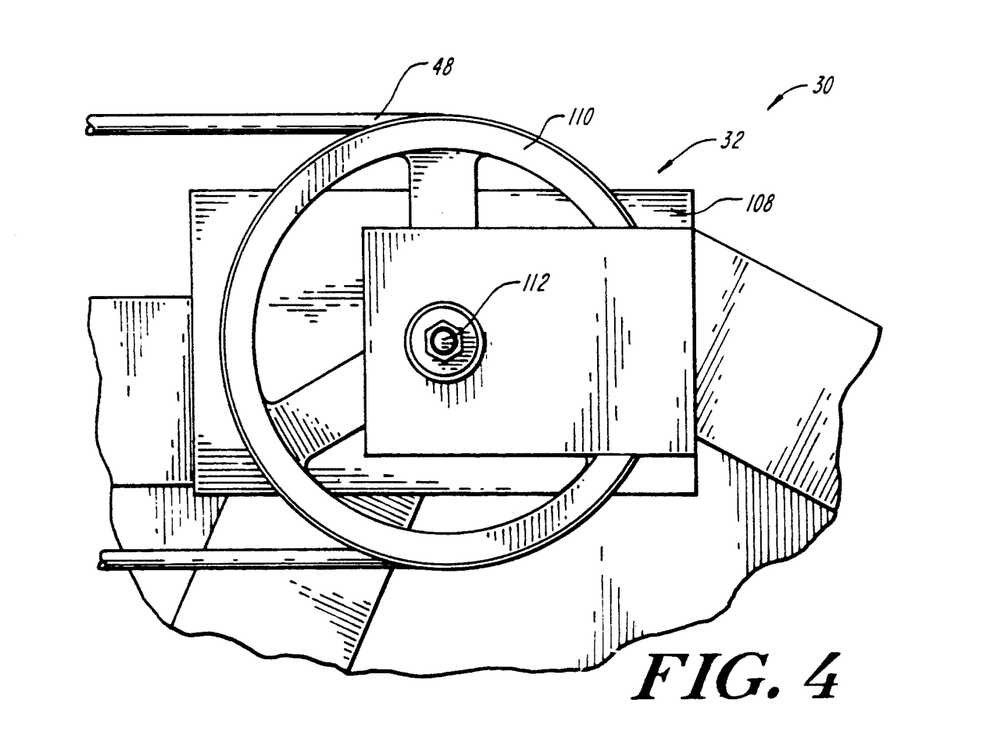
FIG. 4 is a side view of the rear portion of the embodiment of the invention shown in FIG. 1.
Figure 4A:
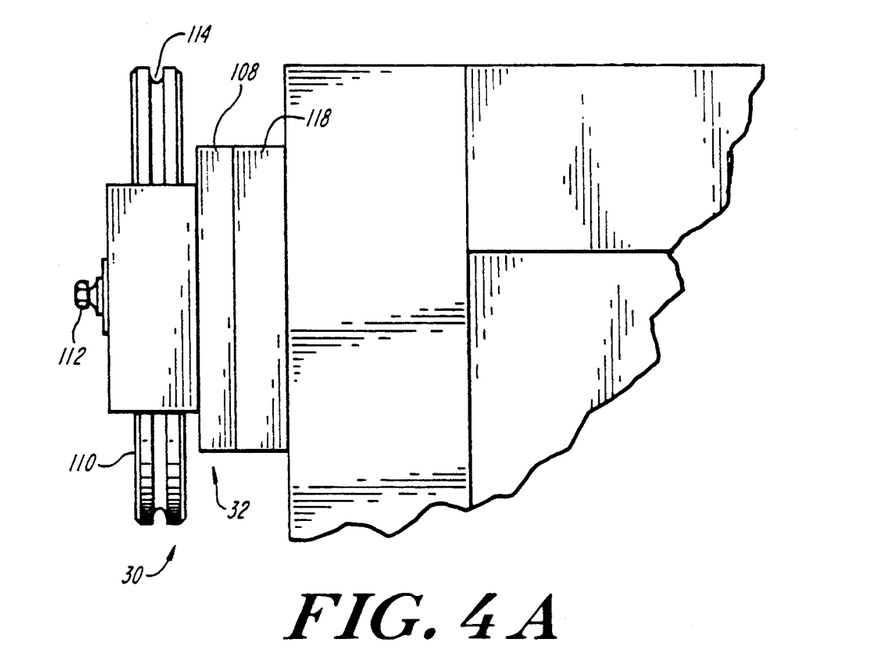
FIG. 4a is a rear view of the left rear portion of the embodiment of the invention shown in FIG. 4.
Figure 4B:
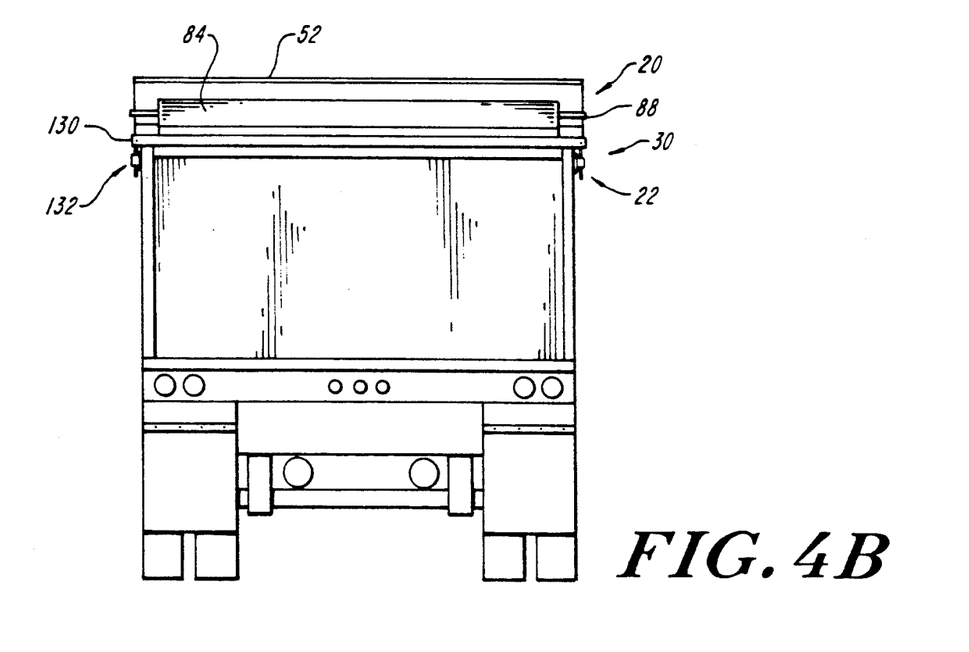
FIG. 4b is a rear view of the embodiment of FIG. 1 located on the open top receptacle.

Referring to FIGS. 4, 4a and 4b, the rear portion 30 of the receptacle cover apparatus 10 includes two rear pulley assemblies 32, one of which is mounted on each side of the receptacle top 12 at its upper rear corner (see FIG. 4b). Each rear pulley assembly 32 includes a mounting plate 108 which is fixedly attached to the rear of the receptacle 12 by way of a shim 118. The shim 118 permits a lateral adjustment of the pulley assembly 32. Each pulley assembly 32 includes a pulley 110 rotatably mounted by a pulley axle 112 to mounting plate 108. One of the cables 48 rides on each pulley in groove 114.

The edge of cover 40 which is not attached to the roller 86 is attached to a single tubular member 130 (FIGS. 5 and 5a) Eyebolts 132, 134 extend from the tubular member 130 in the same plane but in opposite directions. One end 136 of cable 48 is looped through the rearward facing eyebolt 132 and secured to the bight of cable 48 by a cable clamp 140. The other end 138 of cable 48 is looped through the forward facing eyebolt 134 and secured to the bight of cable 48 by a cable clamp 140. The cables 48 by their attachment to tubular member 130 form a closed loop, riding over the rear pulleys 110 and the front pulleys 54.

Figure 5:
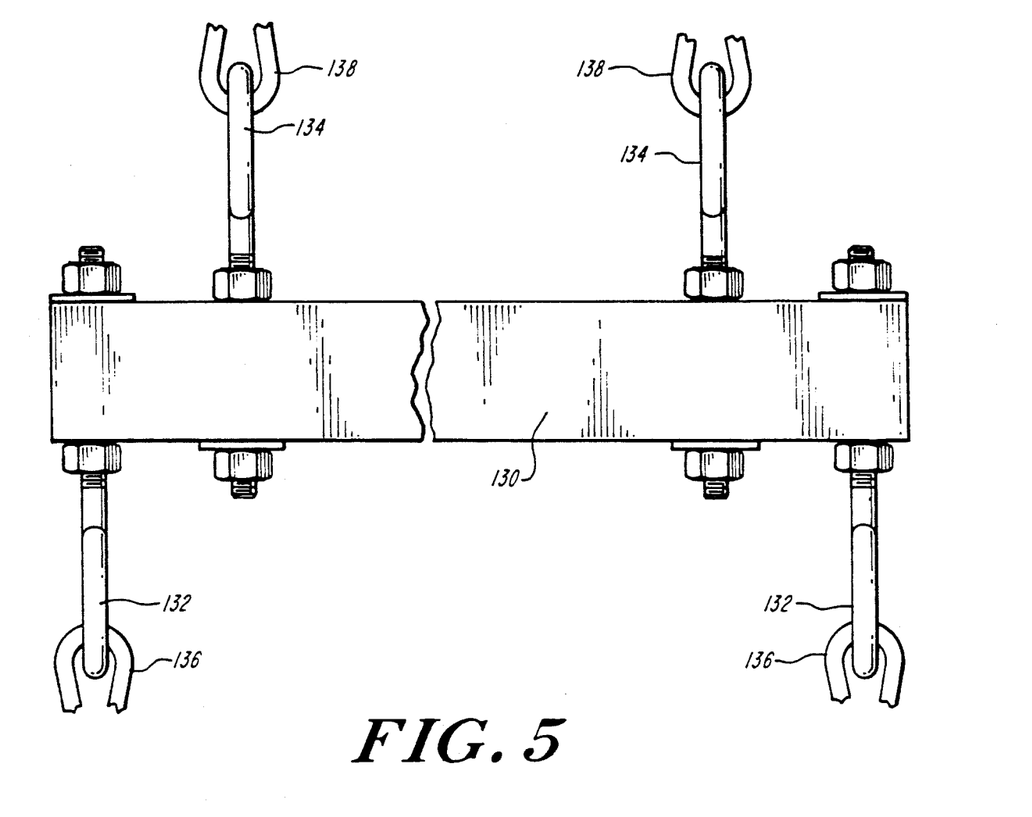
FIG. 5 is a top view of a connecting tubular member of the embodiment of the invention shown in FIG. 1.
Figure 5A:
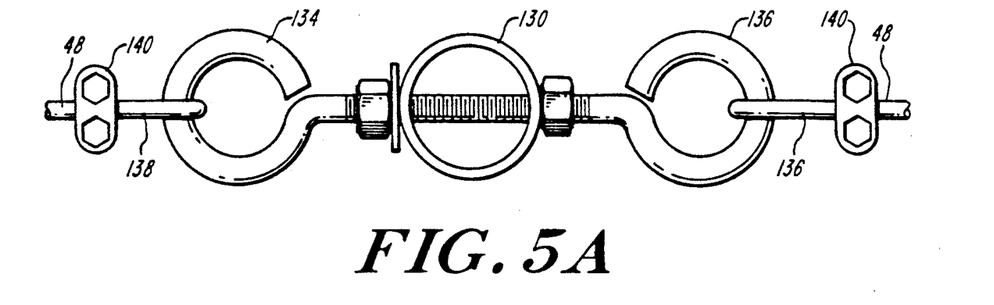
FIG. 5a is a side view of the tubular member shown in FIG. 5.

The cover 40 is unwound from the spring loaded roller assembly 84 by the movement of the tubular member 130 toward the rear of the receptacle 12. When the tubular member 130 reaches the rear pulleys 110, the cover 40 completely covers the top of the receptacle 12. Conversely, the movement of the tubular member 130 toward the front of the receptacle 12 permits the cover 40 to be retracted onto the spring loaded roller assembly 84.

Figure 6:
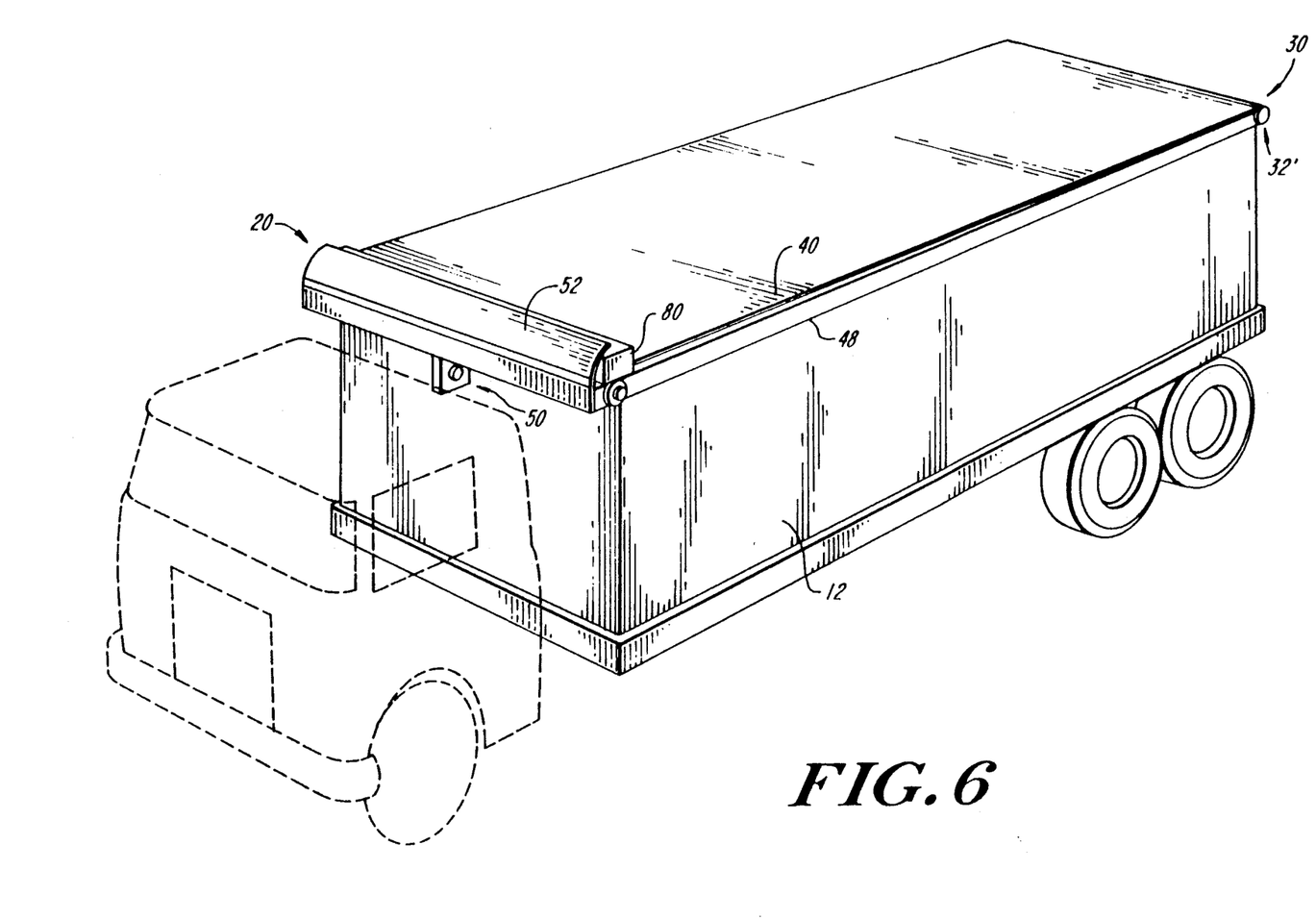
FIG. 6 is a perspective view of another embodiment of the invention.
Figure 6A:
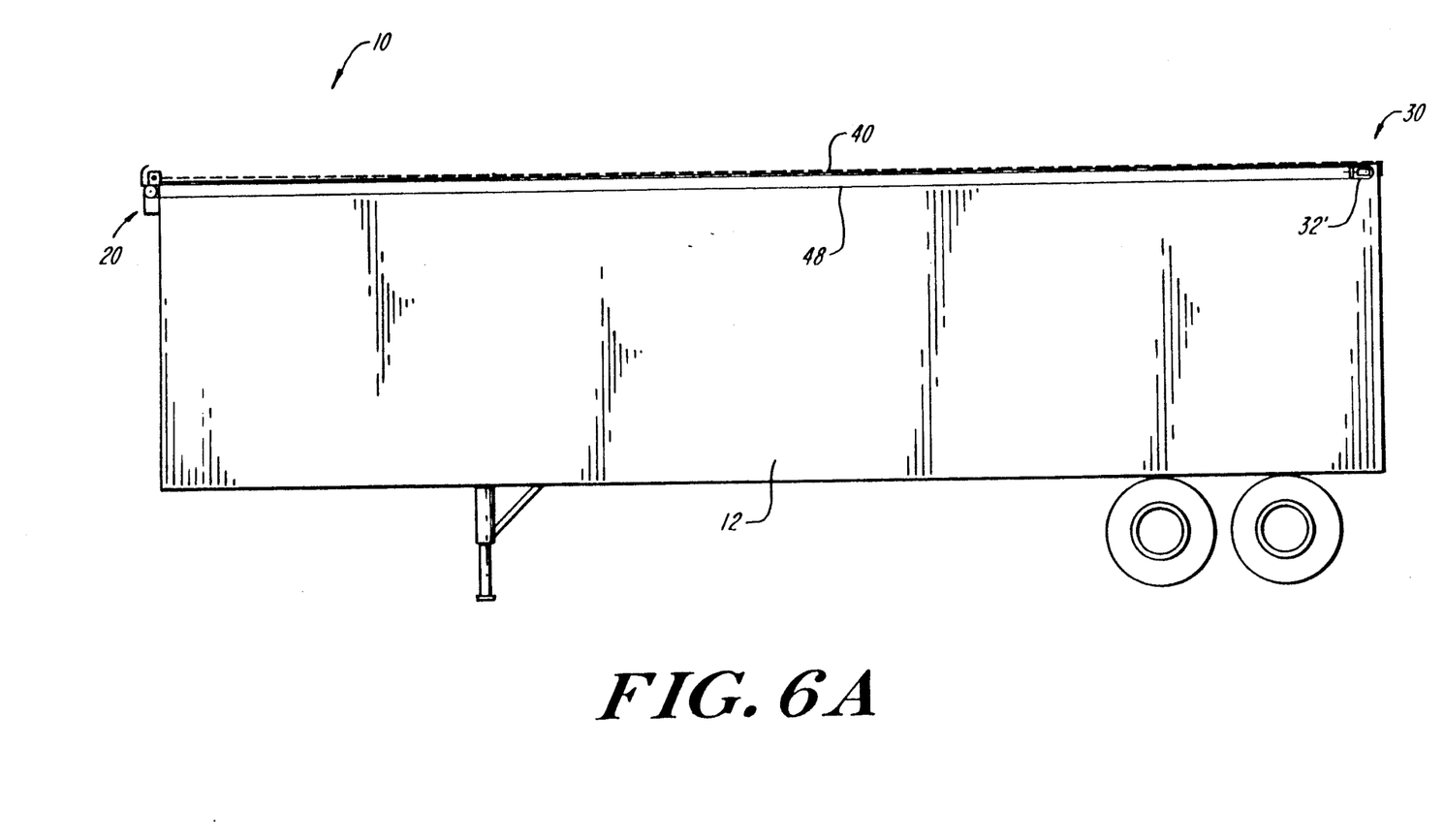
FIG. 6a is a side view of the embodiment of the invention shown in FIG. 6.

A second embodiment of the invention is depicted in FIGS. 6 and 6a (again shown as an open bed trailer only as an example) and is especially useful for covering an open top receptacle in a manner such that the cover 40 extends over the rear edge of the receptacle. The front portion 20 of the cover apparatus 10 is the same as in the previous embodiment.

Figure 7:
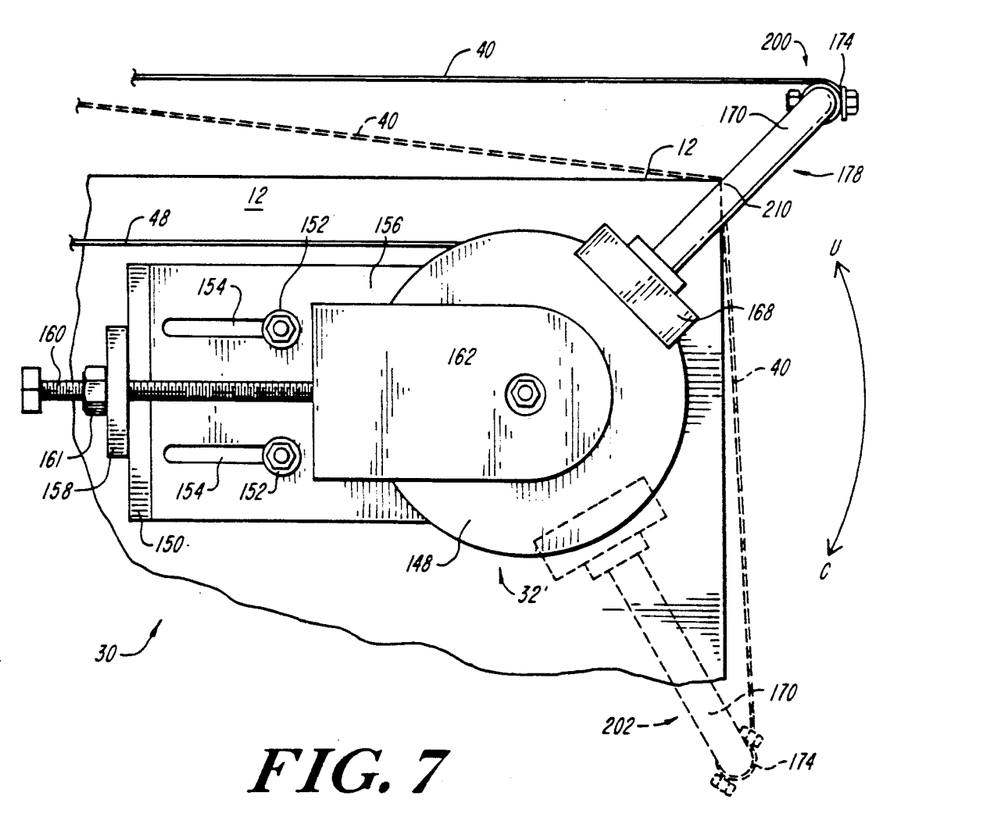
FIG. 7 is a side view of the rear portion of the embodiment of the invention shown in FIG. 6.
Figure 7A:
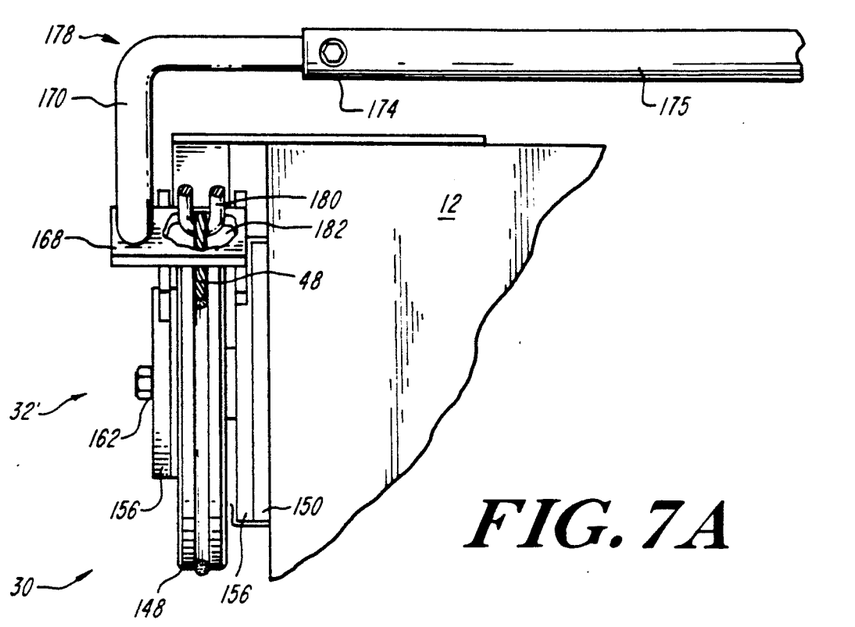
FIG. 7a is a rear view of the embodiment of the invention shown in FIG. 7.
Figure 7B:
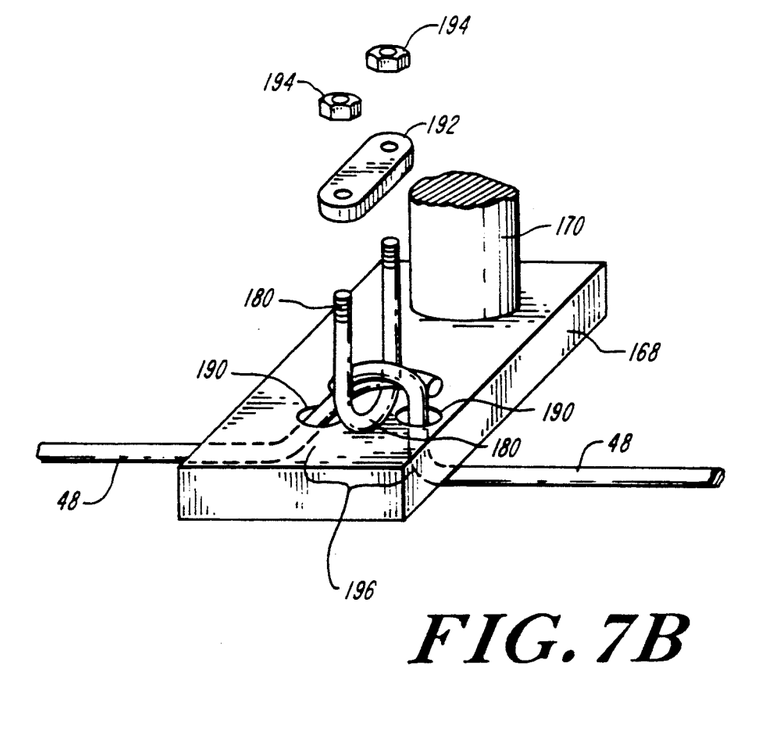

The rear portion 30 of the receptacle cover apparatus 10 consists of two rear pulley assemblies 32. one of which is mounted on each side of the receptacle 12 at its upper rear corner. Referring to FIGS. 7 and 7a, each rear pulley assembly 32 includes a mounting plate 150 which is fixedly attached to the rear of the receptacle 12. A pulley 148 is rotatably mounted by a pulley axle 162 to a pulley bracket 156. The pulley bracket 156 is slidably mounted to the mounting plate 150 and is located in a given position by an adjusting screw 160. The adjusting screw 160 projects through a right angle bracket 158 attached to the mounting plate 150. The adjusting screw 160 engages the threads in a nut 161 welded to the right angle bracket 158 and thereby moves the pulley bracket 156 forward or backward along the side of the receptacle 12 as the adjusting screw 160 is turned. The adjusting screw 160 permits the tension of the cable 48 which rides on the rear pulley 148 to be adjusted. Bolts 152 project through the slots 154 in the pulley bracket 156 into the mounting plate 150. Once the adjusting screw 160 has adjusted the cables 48 to the correct tension, the bolts 152 anchor the pulley assembly 32 in that position to the mounting plate 150.

The edge of cover 40 which is not attached to the roller 86 is attached to a single bowed member 178 (half of the bowed member 178 being shown in FIG. 7a). The bowed member 178 includes a horizontal portion 175 which extends across the top of the receptacle and to which the cover 40 is attached. Each end of the horizontal portion 175 is attached to one end of a curved portion 170 by a bolt 174. The other end of the curved portion 170 is attached to a mounting plate 168 which rests upon the upper loop portion of the loop of one of the cables 48. Each end of the cable 48 passes through a respective hole 190 in the mounting plate 168 and is retained in the u-portion 180 of a cable clamp which is welded to the mounting plate 168. The movable portion 192 of the cable clamp captures the ends of the cable 48 within the u-portion 180 and holds the ends of the cable 48 tightly in place by nuts 194. In this way, the cable 48 can ride smoothly on the pulley 148, since the cable 48 is continuously against the pulley 148 except for a small region 196 where the cable 48 passes through mounting plate 168.

As the cable 48 moves, the mounting plate 168 is moved along, and hence so is the bowed member 178 and attached cover 40. The cover 40 is unwound from the spring loaded roller 86 by the movement by cables 48 of the bow member 178 toward the rear of the receptacle 12. Once the mounting plate 168 reaches the pulley 148, it continues to ride over the pulley 148 (shown as position 200) until the bowed member 178 makes contact (shown in phantom as position 202) with the rear of the receptacle 12. In this position 202 the cover 40 (also shown in phantom) is tightly drawn over the rear edge 210 of the receptacle 12, thereby preventing the billowing of the cover 40 and the loss of the material within the receptacle 12 by, for example, the airstream of the moving receptacle 12. To uncover the top of the receptacle 12, the direction of motion of the cables 48 is reversed and the cover 40 is drawn back into its storage area in the front portion 20.

Although the embodiments shown disclose an electric motor 50 to cause the cables 48 to move, other drive means are also envisioned. Another drive means, for example, a hand crank 250 (shown in phantom in FIG. 3) with a locking mechanism could be attached to the pulley axle 70 thereby avoiding the motor assembly 50, slip clutch 58, chain 60 and drive sprocket 64. Alternatively, the electric motor could be replaced by pneumatic or hydraulic activator to drive the slip clutch 58.

Other embodiments are possible which will still be within the spirit and scope of the claims and it is intended to limit the invention only by the scope of the claims.

What is claimed is:

1. A covering apparatus for a receptacle having an open top, a first end and a second end, said second end having a top edge, said covering apparatus comprising:
    a cover having a first and a second end and a length and width sufficient to cover said open top of said receptacle;
    a spring loaded roller, rotatably mounted at said first end of said receptacle and to which said first end of said cover is attached, said roller adapted for retracting and winding said cover about said roller;
    a pair of first cable pulleys, one of each of said first cable pulleys rotatably mounted at said first end of said receptacle;
    a pair of second cable pulleys, one of each of said second cable pulleys rotatably mounted at said second end of said receptacle;
    a pair of cable loops, one each said cable loop engaging a respective one said first cable pulley and one said second cable pulley, said second end of said cover attached to each said cable loop; and
    an energizing device for causing said pair of first cable pulleys to rotate so as to cause each said cable loop to move about respective first and second respective second cable pulleys, wherein said cover is attached to each said cable loop by a bow member, and said bow member is rotatable about said pair of second cable pulleys;
    said apparatus having a first covered configuration in which said cover is unwound from said roller and extends over said top of said receptacle and downward over said top edge of said second end of said receptacle, and a second uncovered configuration in which said cover is wound about said spring loaded roller and said top of said receptacle is uncovered.

2. The apparatus of claim 1 wherein said energizing device is an electric motor.

3. The apparatus of claim 1 wherein said energizing device is a hand crank.

4. The apparatus of claim 1 wherein said energizing device is a pneumatic activator.

5. The apparatus of claim 1 wherein said energizing device is a hydraulic activator.

6. The apparatus of claim 1 wherein said spring loaded roller is spring biased to cause said roller to rotate and thereby cause said cover to retract about said roller.

7. The apparatus of claim 1 wherein said spring loaded roller is located at the front end of the receptacle.

8. The apparatus of claim 7 wherein said first cable pulley is located at the front end of said receptacle.

9. The apparatus of claim 8 wherein said second cable pulley is located at the rear end of said receptacle.

10. The apparatus of claim 1 further comprising an airshield positioned so as to deflect the movement of air from said spring loaded roller.

11. A cover apparatus for a receptacle having an open top, a first end and a second end, said second end having a top edge, said covering apparatus comprising:
    a flexible cover having a first end and a second end and a length and width sufficient to cover said open top of said receptacle;
    a spring loaded roller, rotatably mounted at the front end of said receptacle and to which said first end of said cover is attached, said roller adapted for retracting and winding said cover about said roller;
    a pair of first cable pulleys, one of each of said first cable pulleys rotatably mounted at said first end of said receptacle;
    a pair of second cable pulleys, one of each of said second cable pulleys rotatable mounted at said second end of said receptacle;
    a pair of cable loops, one each said cable loop engaging a respective one said first cable pulley and one said second cable pulley;
    a bow member which is fixedly attached to each said cable loop and to which said second end of said cover is attached, said bow member rotatable about said pair of second cable pulleys; and
    a motor for causing said pair of first cable pulleys to rotate so as to cause each said cable loop to move about said respective first and said respective second cable pulleys, and thereby to cause said bow member to move;
    said apparatus having a first covered configuration in which said cover extends over said top of said receptacle and downward over said top edge of said second end of said receptacle, and a second uncovered configuration in which said cover is wound about said spring loaded roller and said top of said receptacle is uncovered.

* * * * *